_(12)_ United States Patent
Kandlikar (10) Patent No.: US 11,598,518 B2
(45) Date of Patent: Mar. 7, 2023

(54) DEVICES WITH AN ENHANCED BOILING SURFACE WITH FEATURES DIRECTING BUBBLE AND LIQUID FLOW AND METHODS THEREOF

(71) Applicant: Satish G. Kandlikar, Rochester, NY (US)

(72) Inventor: Satish G. Kandlikar, Rochester, NY (US)

(73) Assignee: Rochester Institute of Technology, Rochester, NY (US)

( * ) Notice: Subject to any disclaimer, the term of this patent is extended or adjusted under 35 U.S.C. 154(b) by 22 days.

(21) Appl. No.: 16/891,616

(22) Filed: Jun. 3, 2020

(65) Prior Publication Data

US 2020/0332997 A1 Oct. 22, 2020

Related U.S. Application Data

(62) Division of application No. 13/471,043, filed on May 14, 2012, now Pat. No. 10,697,629.

(Continued)

(51) Int. Cl.
*F28F 13/18* (2006.01)
*F22G 1/00* (2006.01)
(Continued)

(52) U.S. Cl.
CPC ............... *F22G 1/00* (2013.01); *B01D 1/00* (2013.01); *F28D 15/046* (2013.01);
(Continued)

(58) Field of Classification Search
CPC ...... F28F 13/187; F28F 13/185; F28F 13/182; B01D 17/0205; B01D 3/20
See application file for complete search history.

(56) References Cited

U.S. PATENT DOCUMENTS 3,326,283 A 6/1967 Ware
3,367,415 A * 2/1968 Beurtheret ............... F28F 1/26
976/DIG. 45

(Continued)

FOREIGN PATENT DOCUMENTS

GB 1392762 A * 4/1975 ............... F28F 1/26
JP 2003269882 9/2003
(Continued)

OTHER PUBLICATIONS

Cooke, Dwight, et al., "Pool Boiling Heat Transfer and Bubble Dynamics Over Plain and Enhanced Microchannels," Journal of Heat Transfer, Copyright 2011 by ASME, Published May 2011, vol. 133/052902-1.

(Continued)

*Primary Examiner* — Paul Alvare
(74) *Attorney, Agent, or Firm* — Bond Schoeneck & King, PLLC; Joseph M. Noto (57) ABSTRACT

An enhanced boiling apparatus includes a substrate having at least one heated region, at least one outer surface, and one or more asymmetric shaped cavities extending into the substrate along the at least one outer surface. Each of the one or more asymmetric shaped cavities has a sidewall which intersects at a corner with a bubble pathway surface with a different slope from the sidewall. Each of the asymmetric shaped cavities is configured to non-gravitationally direct fluid that is moving along the sidewall out along the bubble pathway surface.

18 Claims, 11 Drawing Sheets

Related U.S. Application Data (60) Provisional application No. 61/522,936, filed on Aug. 12, 2011, provisional application No. 61/485,859, filed on May 13, 2011.

(51) Int. Cl.
*B01D 1/00* (2006.01)
*F28D 15/04* (2006.01)
*F28D 21/00* (2006.01)

(52) U.S. Cl.
CPC .... *F28F 13/187* (2013.01); *F28D 2021/0064* (2013.01); *Y10T 29/53113* (2015.01)

(56) References Cited

U.S. PATENT DOCUMENTS

| | | | |
|---|---|---|---|
| 3,384,160 A * | 5/1968 | Beurtheret | F28D 15/00 165/104.21 |
| 3,455,376 A * | 7/1969 | Beurtheret | G21C 17/038 976/DIG. 188 |
| 3,496,752 A | 2/1970 | Kun et al. | |
| 3,521,705 A | 7/1970 | Beurthert et al. | |
| 3,598,180 A | 8/1971 | Moore | |
| 5,052,476 A | 10/1991 | Sukumoda et al. | |
| 5,259,448 A * | 11/1993 | Masukawa | F28F 13/187 165/184 |
| 5,275,234 A | 1/1994 | Booth | |
| 5,536,856 A | 7/1996 | Harrison et al. | |
| 5,555,622 A | 9/1996 | Yamamoto et al. | |
| 5,704,424 A | 1/1998 | Kohno et al. | |
| 5,791,405 A * | 8/1998 | Takiura | B21C 37/20 165/184 |
| 5,915,467 A | 6/1999 | Ishikawa et al. | |
| 6,164,370 A | 12/2000 | Robinson et al. | |
| 6,173,763 B1 * | 1/2001 | Sano | F28F 1/40 165/184 |
| 6,176,301 B1 * | 1/2001 | Bennett | F28F 1/40 165/184 |
| 6,176,302 B1 | 1/2001 | Takahashi et al. | |
| 6,298,909 B1 | 10/2001 | Fukatami et al. | |
| 7,035,104 B2 | 4/2006 | Meyer | |
| 7,267,166 B2 | 9/2007 | Leterrible et al. | |
| 7,300,821 B2 | 11/2007 | Farrar et al. | |
| 7,304,380 B2 | 12/2007 | Farrar et al. | |
| 7,311,137 B2 | 12/2007 | Thors et al. | |
| 7,335,965 B2 | 2/2008 | Farrar | |
| 7,387,912 B2 | 6/2008 | Farrar | |
| 7,400,502 B2 | 7/2008 | Hamman | |
| 7,485,497 B2 | 2/2009 | Farrar et al. | |
| 7,489,034 B2 | 2/2009 | Farrar | |
| 7,492,042 B2 | 2/2009 | Farrar et al. | |
| 7,578,337 B2 | 8/2009 | Spokoiny et al. | |
| 7,980,078 B2 | 7/2011 | McGutchen et al. | |
| 7,987,677 B2 | 8/2011 | McCutchen | |
| 8,081,478 B1 | 12/2011 | Drexler et al. | |
| 8,087,256 B2 | 1/2012 | Babkin et al. | |
| 2002/0096314 A1 * | 7/2002 | Liu | B21C 37/20 165/184 |
| 2005/0274506 A1 | 12/2005 | Bhatti et al. | |
| 2006/0228505 A1 | 10/2006 | Goto et al. | |
| 2007/0089868 A1 | 4/2007 | Houfuku et al. | |
| 2012/0051489 A1 | 3/2012 | Varanasi et al. | |
| 2012/0077055 A1 * | 3/2012 | Fujii | F28F 3/048 72/203 |

FOREIGN PATENT DOCUMENTS

| | | | |
|---|---|---|---|
| JP | 2010256000 A | 11/2010 | |
| WO | 2010143564 | 12/2010 | |
| WO | WO-2010143564 A1 * | 12/2010 | B21C 37/02 |

OTHER PUBLICATIONS

Jabardo, J.M. Saiz, "An Overview of Surface Roughness Effects on Nucleate Boiling Heat Transfer", The Open Transport Phenomena Journal, Received Oct. 31, 2009.

Furberg, Richard, "Enhanced Boiling Heat Transfer from a Novel Nanodendritic Micro-porous Copper Structure", KTH School of Industrial Engineering and Management, Jun. 2006.

\* cited by examiner

DEVICES WITH AN ENHANCED BOILING SURFACE WITH FEATURES DIRECTING BUBBLE AND LIQUID FLOW AND METHODS THEREOF

REFERENCE TO RELATED APPLICATION

This application is a Divisional Application of Non-Provisional application Ser. No. 13/471,043, filed May 14, 2012, which relates and claims priority Provisional Application Nos. 61/522,936, filed on Aug. 12, 2011 and 61/485,859 filed on May 13, 2011, the entirety of each of which are hereby incorporated by reference in their entirety.

FIELD

This technology generally relates to devices and methods for heat transfer and, more particularly, to devices with an enhanced boiling surface with features directing bubble and liquid flow and methods thereof.

BACKGROUND

Heat transfer relates to the exchange of thermal energy between physical systems, such as between a heated region and an adjacent liquid. With these types of heat transfer systems, as the liquid is heated above its saturation temperature near the heated surface, bubbles are formed and released in the liquid which assists with the heat transfer process. In these systems, when the liquid is stationary the heat transfer occurs through pool boiling and when the liquid is moving the heat transfer occurs through flow boiling. Although these types of systems have generally been capable of producing necessary heat transfer, there continue to be limitations with respect to their performance.

SUMMARY

An enhanced boiling apparatus includes a substrate having at least one heated region and at least one outer surface and one or more asymmetric shaped cavities extending into the substrate along the outer surface. Each of the one or more asymmetric shaped cavities has a sidewall which intersects at a corner with a bubble pathway surface with a different slope from the sidewall. Each of the asymmetric shaped cavities is configured to non-gravitationally direct fluid that is moving along the sidewall out along the bubble pathway surface.

A method for making an enhanced boiling apparatus includes providing a substrate having at least one heated region and at least one outer surface and forming one or more asymmetric shaped cavities that extend into the substrate along the outer surface. Each of the one or more asymmetric shaped cavities has a sidewall which intersects at a corner with a bubble pathway surface with a different slope from the sidewall. Each of the asymmetric shaped cavities is configured to non-gravitationally direct fluid that is moving along the sidewall out along the bubble pathway surface.

This technology provides a number of advantages including providing more effective and efficient devices with enhanced boiling surfaces with features directing bubble and liquid flow. With this technology, the device provides enhanced heat transfer characteristics when compared to existing heat transfer systems.

DETAILED DESCRIPTION

Figure 1:
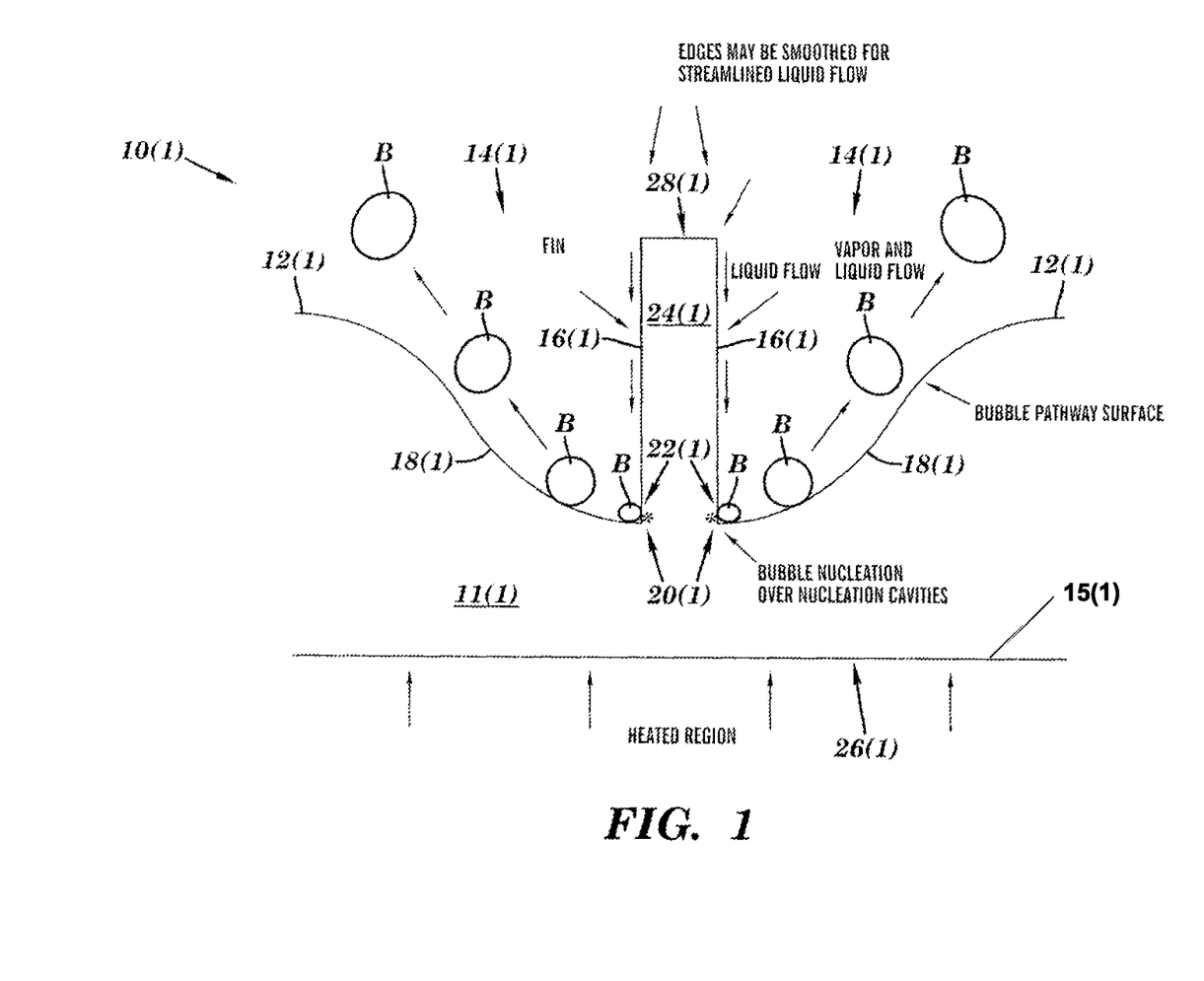
FIG. 1 is a cross-sectional view of an exemplary device with an enhanced boiling surface.
Figure 2:
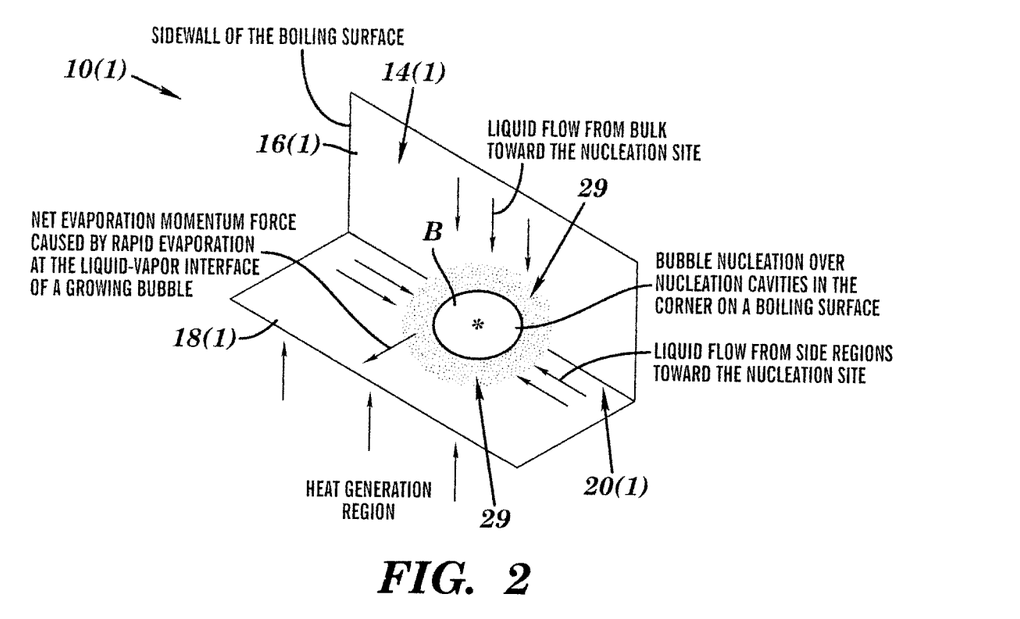
FIG. 2 is a diagram of a portion of the exemplary device illustrated in FIG. 1.

An exemplary device 10(1) with enhanced boiling surfaces with features directing bubble and liquid flow is illustrated in FIGS. 1-2. The device 10(1) includes a substrate 11(1) having an outer surface 12(1) with asymmetric shaped cavities 14(1) each with a sidewall 16(1), bubble pathway surface 18(1), corner 20(1), and nucleation cavities 22(1), a land region 24(1), and a heated region 26(1), although the device can have other types and numbers of systems, devices, components and other elements in other configurations. This technology provides a number of advantages including providing more effective and efficient devices with enhanced boiling surfaces with features directing bubble and liquid flow.

Referring more specifically to FIG. 1, the exemplary device 10(1) includes two asymmetric shaped cavities 14(1)

which extend in from the outer surface 12(1) of the substrate 11(1), although the device can have other types and numbers of cavities in other shapes and configurations. By way of example only, in other embodiments of this technology the substrate could have projections on the outer surface which are configured to form the asymmetric cavities which extend out from the outer surface of the substrate, such as by etching one or more layers formed on a substrate by way of example only. In this particular example, the asymmetric shaped cavities 14(1) are on opposite sides of the land region 24(1) and are a mirror image of each other, although the asymmetric shaped cavities could have different shapes from each other.

Each of the cavities 14(1) of exemplary device 10(1) has the sidewall 16(1) which extends from a top 28(1) of the land region 24(1) to the corner 20(1). In this particular example, each of the sidewalls 16(1) has a substantially straight shape which extends in a direction substantially perpendicular to the outer surface 12, although each of the sidewalls could have other shapes, configurations, and other orientations, such as those illustrated and described in greater detail herein by way of example only. The shape and configuration of the sidewalls 16(1) helps to direct cooling liquid down towards the corners 20(1) from the end 28(1) and/or along a length of the sidewalls 16(1) as illustrated in the diagram shown in FIG. 2. A slope of each of the sidewalls 16(1) with respect to the outer surface 12(1) is greater than the slope of each of the bubble pathway surfaces 18(1) with respect to the outer surface 12(1).

In this example, in each of the cavities 14(1) the sidewall 16(1) and bubble pathway surface 18(1) meet at the corner 20(1) at a substantially right angle, although as illustrated and described in other examples herein the sidewall 16(1) and bubble pathway surface 18(1) can meet at the corner 20(1) at other angles and in other configurations, such as with a slight indentation by way of example only. Each of the corners 20(1) forms a nucleation site, although each of the cavities 14(1) can have other types and numbers of nucleation sites at other locations, such as nucleation cavities formed in and along the bubble pathway surface 18(1) spaced from the corner 20(1) by way of example only. By way of example only, each of the corners 20(1) may have natural and/or artificial nucleation sites. These artificial nucleation sites may be made by using notches, grooves, re-entrant cavities, holes, and/or the incorporation of a porous layer as illustrated and described in greater detail herein with reference to FIG. 4, although other techniques for creating nucleation sites could be used.

Each of the cavities 14(1) also has the bubble pathway surface 18(1) which extends from the corner 20(1) back up to the outer surface 12(1). Each of the bubble pathway surfaces 18(1) has a shape and configuration to direct fluid that is moving along the sidewall 16(1) out along the bubble pathway surface 18(1). In this particular example, each of the bubble pathway surfaces 18(1) has a shallow backwards S-shaped configuration, although as illustrated and described with other examples herein the bubble pathway surface can have other configurations, such as curved and straight by way of example only.

In this particular example, the land region 24(1) has a substantially rectangular shape and extends between the cavities 14(1), although the land region 24(1) could have other shapes and configurations. The land region 24(1) has a substantially flat end 28(1) along the outer surface 12(1), although the land region 24(1) could have other shapes and configurations for the end as illustrated and described with the examples herein, such as tapered or rounded by way of example only. A heated region 26(1) is located adjacent a substrate base 15(1) on an opposing side of the substrate 11(1) from the outer surface 12(1), although the heated region could be in other locations, as illustrated and described with the example herein, such as within the substrate by way of example only.

Referring to the exemplary diagram in FIG. 2, the diagram of this exemplary asymmetric depression 14(1) as well as others in accordance with this technology as illustrated and described in the other embodiments herein may be further modified to further enhance heat transfer with additional surface modification features 29 on part or all of sidewall 16(1) and/or bubble pathway surface 18(1). By way of example only, these additional surface modification features can include providing part or all of sidewall 16(1) and/or bubble pathway surface 18(1) with uniform roughness, non-uniform roughness, structured roughness, projections, microfins, nanostructures, nanowires, nanopillars, indentations, winglets, flow diverters and pores. These enhanced surface features are provided to achieve at least one of the following goals: improve heat transfer coefficient; provide more surface area; improve the wettability of the surface; reduce the flow resistance for liquid; reduce flow resistance for the flow of bubbles and liquid; increase number of nucleation sites; control bubble diameter; control bubble departure frequency; provide tunnels for fluids to move; improve microconvection heat transfer; improving transient conduction heat transfer; improve microlayer evaporation; provide additional surface area; change contact angle; and provide more efficient liquid pathway to the nucleation sites.

The particular geometrical dimensions and configurations of various features of an exemplary device with enhanced boiling surfaces with features directing bubble and liquid flow as illustrated by way of the embodiments illustrated and described herein by way of example only are selected to optimize the heat transfer performance for different fluids, including pure fluids and mixtures, and operating conditions, such as subcooling, saturation pressure, and/or flow rate by way of example only. These features by reference to the device 10(1) by way of example only include the asymmetric shaped depression 14(1), the sidewall 16(1), the bubble pathway surface 18(1), the corner 20(1), the nucleation cavities 22(1), and the land region 24(1). The particular geometrical dimensions and configurations for these features referenced above include the height, width, slope, shape, number and placement of various surfaces on the sidewall 16(1) and/or the bubble pathway surface 18(1), and shape of the corners by way of example only.

Figure 3:
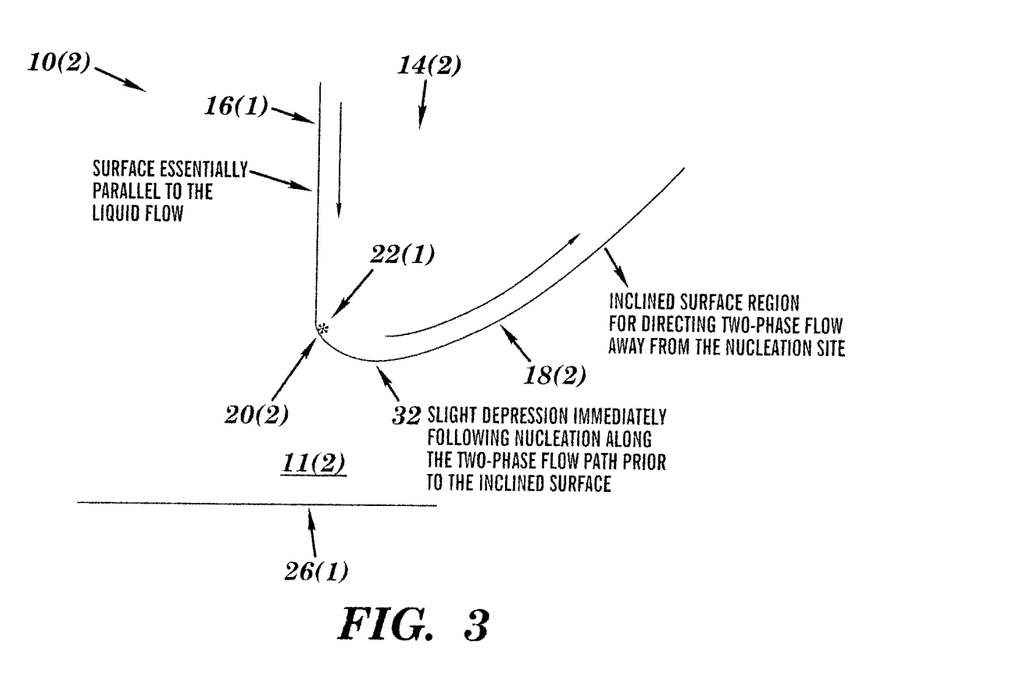
FIG. 3 is a cross-sectional view of a portion of another exemplary device with an enhanced boiling surface.

Referring to FIG. 3, another exemplary device 10(2) with an enhanced boiling surface is illustrated. The device 10(2) is the same in structure and operation as the device 10(1), except as illustrated and described herein. Elements in device 10(2) which are like those in device 10(1) will have like reference numerals.

In this particular example, the exemplary device 10(2) has an asymmetric shaped depression 14(2) in substrate 11(2) with a rounded indentation 32 in the bubble pathway surface 18(2) immediately following corner 20(2), although the asymmetric shaped depression 14(2) could have other shapes and configurations. The indentation 32 immediately following the corner 20(2) helps to facilitate directing additional liquid to the nucleation cavities 22(1) for bubble formation. The bubble pathway surface 18(2) has a curved shape as it extends out towards the outer surface 12(1), although as illustrated and described with other examples herein the bubble pathway surface can have other configurations.

Figure 4A:
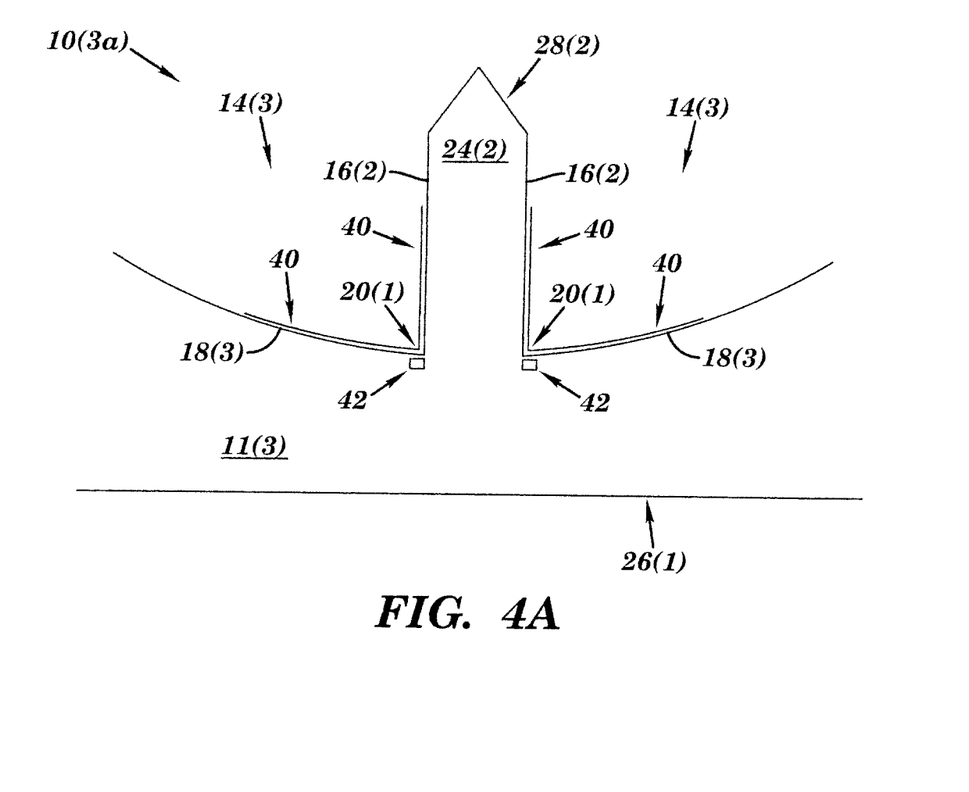
FIG. 4A is a cross-sectional view of a portion of yet another exemplary device with an enhanced boiling surface.
Figure 4B:
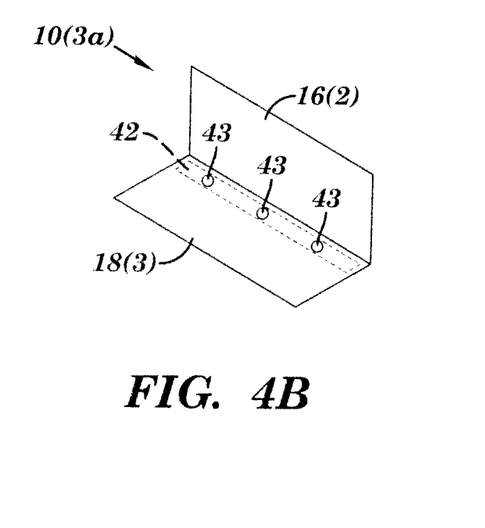
FIG. 4B is a diagram of the exemplary device illustrated in FIG. 4A with a continuous channel adjacent to a corner.
Figure 4C:
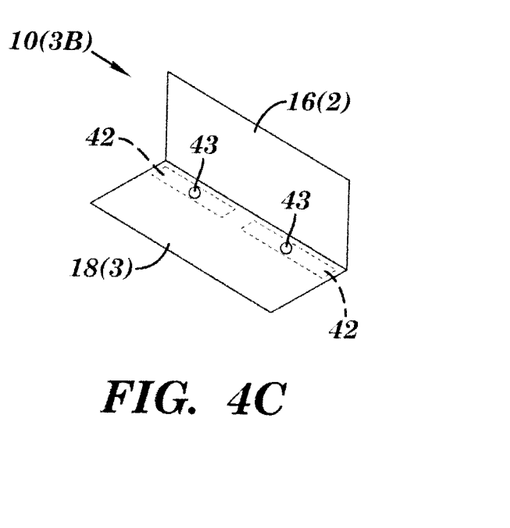
FIG. 4C is a diagram of an alternative for the exemplary device illustrated in FIG. 4A with a discontinuous channel with a pair of sections adjacent to a corner.

Referring to FIGS. 4A-4C, other exemplary devices 10(*3a*) and 10(*3b*) each with an enhanced boiling surface are illustrated. The devices 10(*3a*) and 10(*3b*) are each the same in structure and operation as the device 10(1), except as illustrated and described herein. Elements in devices 10(*3a*) and 10(*3b*) which are like those in devices 10(1)-10(2) will have like reference numerals.

In this particular example, the exemplary devices 10(*3a*) and 10(*3b*) each have asymmetric shaped cavities 14(3) in substrate 11(3) which are mirror images of each other and are separated by a land region 24(2), although the each of the cavities could have other shapes and configurations. The land region 24(2) has a portion with a substantially rectangular shape and an end 28(2) that tapers to a substantially zero width or point, although the land region and end could have other shapes and configurations. The tapered end 28(2) helps to direct liquid flow down the sidewalls 16(2) towards the corners 20(1).

A lower portion of each of the sidewalls 16(2) in each of the devices 10(*3a*) and 10(*3b*) has a substantially straight shape which extends in a direction substantially perpendicular to the outer surface 12 with an upper portion of each of the sidewalls 16(2) which also is substantially straight, but extend inwards to form the tapered end 28(2), although each of the sidewalls could have other shapes, configurations and orientations. The bubble pathway surface 18(3) in each of the devices 10(*3a*) and 10(*3b*) has a curved shape as it extends out towards the outer surface 12(1) without the indentation 32 shown in the device 10(2) in FIG. 3, although the bubble pathway surface can have other shapes, configurations, and orientations as illustrated and described by other embodiments herein by way of example only.

Additionally, optional corner channels 42 may also be formed in the substrate adjacent the corners 20(1) in each of the devices 10(*3a*) and 10(*3b*). These corner channels 42 extend along the corners 20(1) and may be continuous as shown in FIG. 4(*b*) or may be made in discontinuous sections of different lengths as shown in FIG. 4(*c*), although the channel and/or sections can have other configurations, such as discontinuous sections of the same length by way of example only. The channels 42 are in fluid communication through openings 43 with asymmetric shaped cavities 14(3), although other manners for fluidly connecting the channel with the asymmetric cavities can be used, such as being open to the liquid along the entire length of the channel by way of example only. The channels 42 act as reservoirs feeding vapor for bubble nucleation in the region of corner 20(1).

An optional porous layer 40 or other enhance surface feature for providing nucleation cavities 22(1) of desired dimensions to promote bubble nucleation may also be used on the surfaces at the corner, and/or on the surfaces along the liquid and bubble pathways, either entirely or selectively. In this particular example, the porous layer 40 is applied on the sidewall 16(2) and on the bubble pathway surface 18(3) in asymmetric cavities 14(3) either over the entire surfaces or one selective portion(s) of these surfaces. The porous layer 40 may be applied to or created on surfaces of the asymmetric shaped cavities through manufacturing processes, such as coatings, etching, machining, laser machining, laser etching, wire EDM, and surface erosion techniques by way of example only. The porous layer 40 may be applied before, after, or during any intermediate steps of the manufacturing of the surfaces of the asymmetric shaped cavities. This porous layer 40 may be applied uniformly as illustrated in this example or selectively over entire region or only over portions of the sidewall and/or bubble pathway surface. The selected regions might include regions in the asymmetric shaped cavities in the vicinity of the corner 20(1) where bubble nucleation is desired. The additional nucleation sites 22(1) in these selected regions would generate more bubble activity. The flow induced by the bubbles generated in the corner 20(1) of the asymmetric shaped cavities sweeps the bubbles nucleated along the bubble pathway surfaces. The additional enhanced surface features described in the examples herein also may be used in conjunction with one or more active enhancement devices positioned on surfaces of the asymmetric cavities, such as vibrators, positive pressure pulses, negative pressure pulses, microjets, vibrations, and wave generators, such as ultrasound or acoustic wave generators, by way of example only.

Figure 5A:
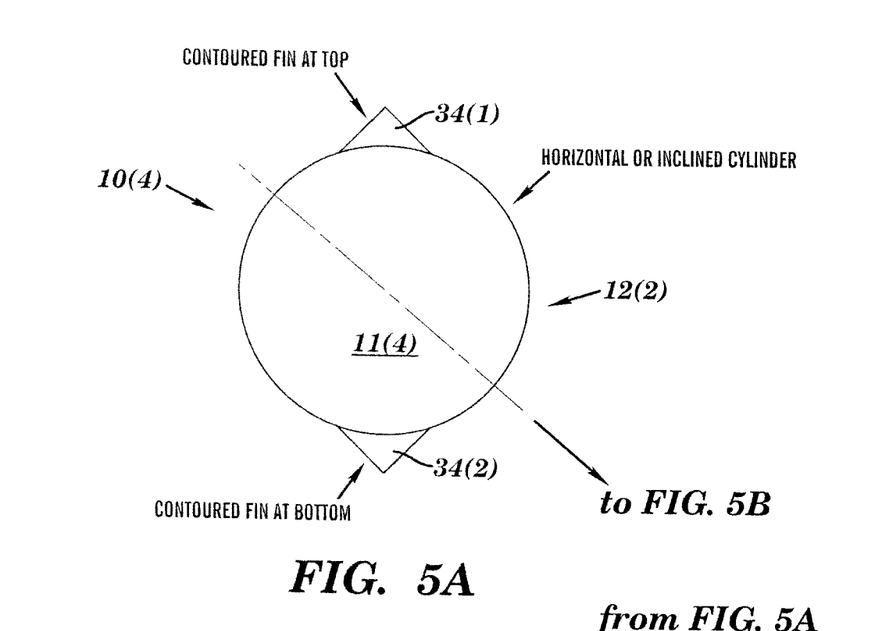
FIG. 5A is a top view of another exemplary cylinder shaped device with an enhanced boiling surface.
Figure 5B:
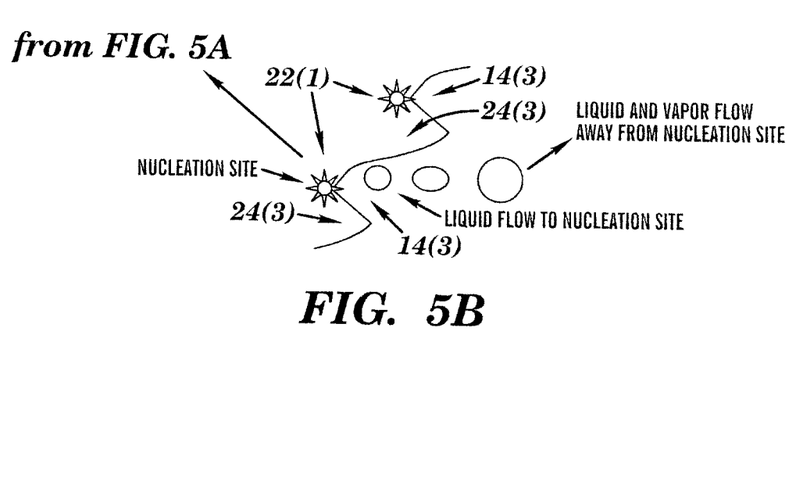
FIG. 5B is an enlarged cross-sectional view through a portion of a side of the device shown in FIG. 5A.

Referring to FIGS. 5A-5B, another exemplary device 10(4) with an enhanced boiling surface is illustrated. The device 10(4) is the same in structure and operation as the device 10(1), except as illustrated and described herein. Elements in device 10(4) which are like those in devices 10(1)-10(3) will have like reference numerals.

In this particular example, the exemplary device 10(4) has substrate 11(4) which has a cylindrical shape and with fins 34(1) and 34(2), although the substrate 11(4) can have other types and numbers of fins or other protrusions having other shapes, configurations, and orientations. The fins 34(1) and 34(2) allow for liquid flow around the tube without creating a stagnation region, and allowing liquid flow to the nucleation sites 22(1) in corners 20(1) with vapor flow away from the nucleation sites 22(1) without interfering with the incoming liquid flow in the stagnation region. Such fins may also be added for diverting the bubble flow away from the nucleation site and/or incoming liquid flow. As illustrated in greater detail in FIG. 5B, an outer surface 12(2) of the substrate 12(2) has a series of asymmetric shaped cavities 14(3) each with a sidewall 16(1) and bubble pathway surface 18(3) which extend around the outer surface 12(2) of the substrate 11(4), although the outer surface 12(2) could have other shapes, configurations and orientations for the cavities 14(3). Each of the asymmetric shaped cavities 14(3) are separated by land regions 24(3) that have a curved bubble pathway surface 18(3) and a straight sidewall 16(1) to form a curved triangular shape, although the land regions could have other shapes, configurations, and orientations.

Figure 6A:
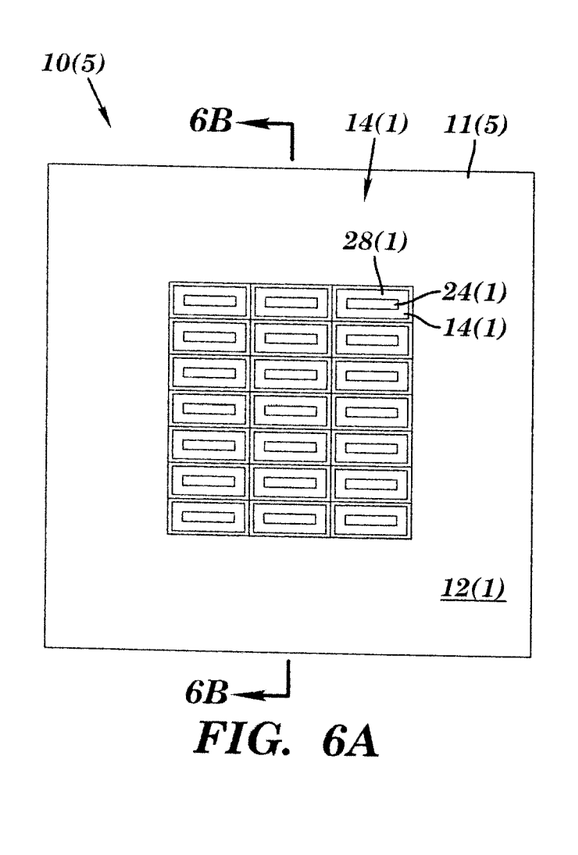
FIG. 6A is a top view of another exemplary device with an enhanced boiling surface having a plurality of discrete cavities.
Figure 6B:
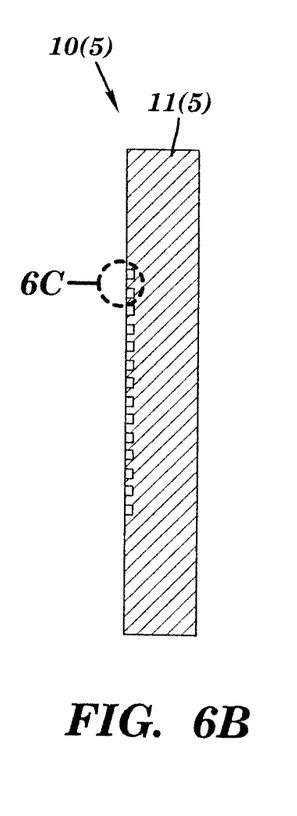
FIG. 6B is a cross-sectional view of the device taken along line 6B-6B in FIG. 6A.
Figure 6C:
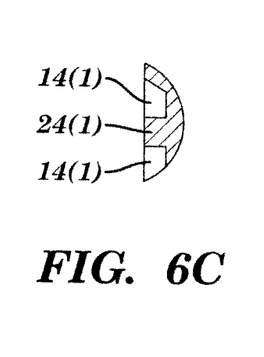
FIG. 6C is an enlarged view of an enhanced surface feature of the device shown in FIG. 6B.

Referring to FIGS. 6A-6C, another exemplary device 10(5) with an enhanced boiling surface is illustrated. The device 10(5) is the same in structure and operation as the device 10(1), except as illustrated and described herein. Elements in device 10(5) which are like those in devices 10(1)-10(4) will have like reference numerals.

In this particular example, the exemplary device 10(5) has three columns and seven rows of adjacent and spaced apart asymmetric shaped cavities 14(1) formed into the outer surface 12(1) of the substantially flat shaped substrate 11(5), although the device 10(5) could have other types and numbers of indentations and substrates in other configurations. Each of the asymmetric shaped cavities 14(1) has a land region 24(1) which is spaced in from a side of the asymmetric shaped depression 14(1), although other spacing regions and configurations could be used. By way of example only, the three columns and seven rows of adjacent and spaced apart asymmetric shaped cavities 14(1) comprise a 10 mm×10 mm square region of a 20 mm×20 mm copper chip which comprises the outer surface 12(1) of the substrate 10(5), although the device 10(5) can have other dimensions and can utilize other materials. Additionally, by way of example only, the asymmetric shaped cavities 14(1) can be quickly and efficiently formed into the outer surface 12(1) of the substrate 11(5) with a punch configured to form the asymmetric shaped depression, although other manners for forming the asymmetric cavities could be used.

Figure 7A:
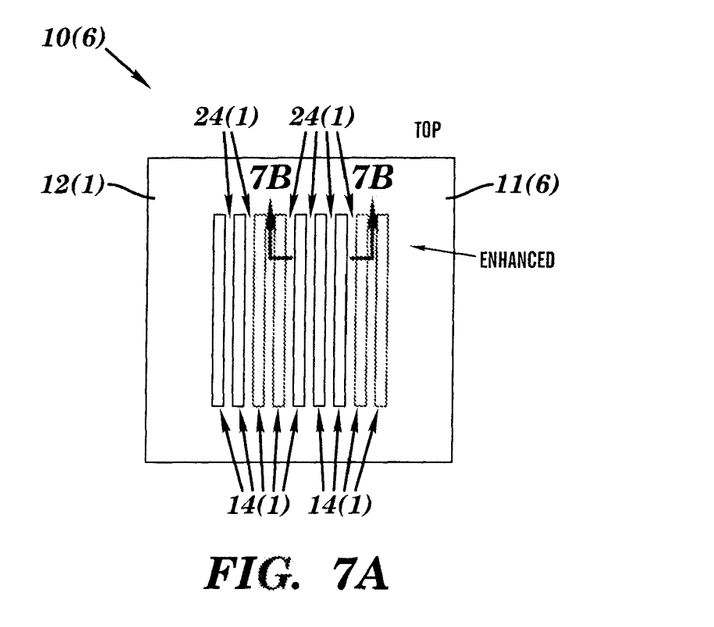
FIG. 7A is a top view of another exemplary device with an enhanced boiling surface having a plurality of elongated cavities.
Figure 7B:
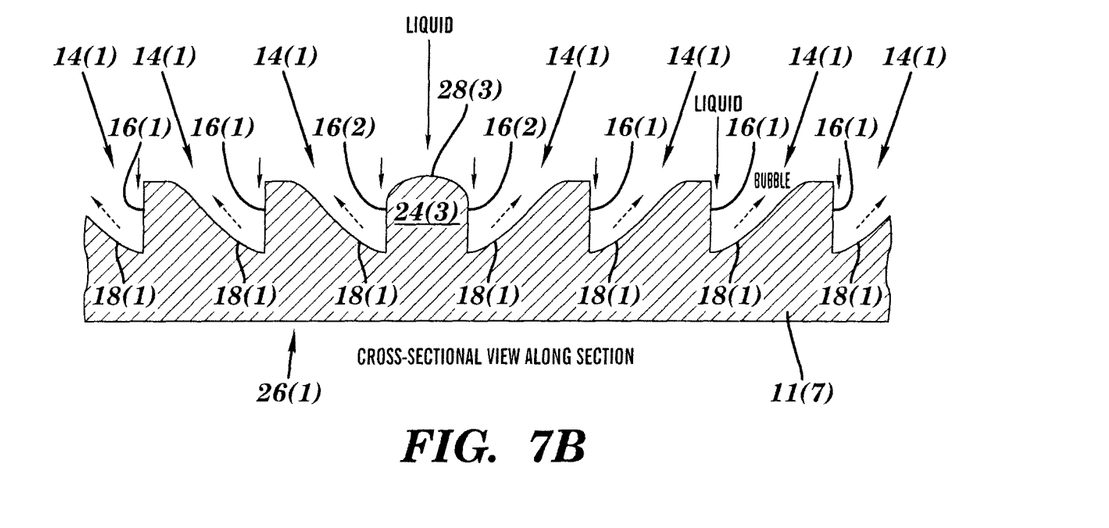
FIG. 7B is a cross-sectional view of the device taken along line 7B-7B in FIG. 7A.

Referring to FIGS. 7A and 7B, another exemplary device 10(6) with an enhanced boiling surface is illustrated. The device 10(6) is the same in structure and operation as the device 10(1), except as illustrated and described herein. Elements in device 10(6) which are like those in devices 10(1)-10(5) will have like reference numerals.

In this particular example, the exemplary device 10(6) has nine substantially parallel columns of adjacent and spaced apart asymmetric shaped cavities 14(1) formed into the outer surface 12(1) of the substantially flat shaped substrate 11(6), although the device 10(6) could have other types and numbers of asymmetric shaped cavities and substrates in other shapes, configurations, and orientations. The asymmetric shaped cavities 14(1) are each spaced apart from each other by a land region 24(1), although other spacing regions and configurations could be used.

Figure 8A:
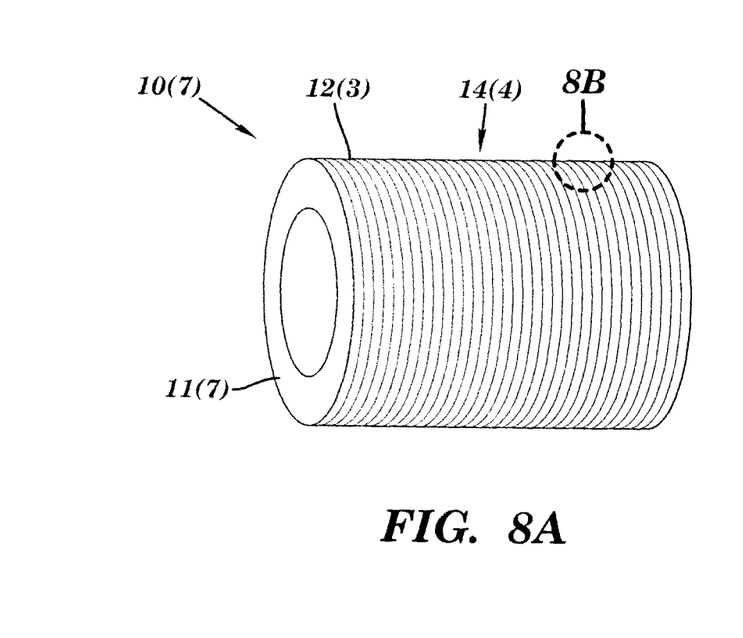
FIG. 8A is a perspective view of another exemplary tubular shaped device with an enhanced boiling surface with circumferential cavities.
Figure 8B:
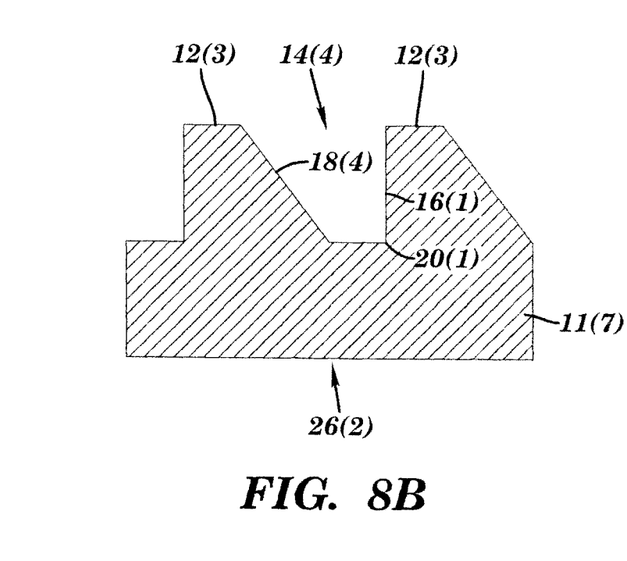
FIG. 8B is an enlarged view of an enhanced surface feature of the device shown in FIG. 8A.

Referring to FIGS. 8A-8B, another exemplary device 10(7) with an enhanced boiling surface is illustrated. The device 10(7) is the same in structure and operation as the device 10(1), except as illustrated and described herein. Elements in device 10(7) which are like those in devices 10(1)-10(7) will have like reference numerals.

In this particular example, the exemplary device 10(7) has a tubular shaped substrate 11(7) with an outer surface 12(3) which has a plurality of spaced apart and substantially parallel asymmetric shaped cavities 14(4) extending in a direction about a circumference of the tubular shaped substrate 11(7), although each of the asymmetric shaped cavities 14(4) could have other shapes, configurations and orientations and may only extend partially around the substrate. Each of the asymmetric shaped cavities 14(4) has a substantially straight sidewall 16(1) which extends in a direction substantially perpendicular from the outer surface 12(3) to the corner 20(1) which comprises a nucleation site, although each of the sidewalls could have other shapes, configurations, and other orientations.

Additionally, each of the asymmetric shaped cavities 14(4) has a bubble pathway surface 18(4) which has a first substantially flat portion which extends out from the corner 20(1) followed by another straight portion that extends back out to the outer surface 12(3), although each of the bubble pathway surfaces 18(4) could have other shapes, configurations, and other orientations. The first substantially flat portion helps to facilitate directing additional liquid to the nucleation cavities 22(1) for bubble formation. The orientation of the taper for each of the bubble pathway surfaces 18(4) is shown to be in the same direction, although other configurations showing alternately changing taper directions can also be implemented. Any combination of these tapers can be implemented depending on the desired flow path for the vapor bubbles and the liquid flow. A heated region 26(2) is located inside the tubular shaped substrate 11(7) and on an opposing side from the outer surface 12(3), although the heated region could be in other locations.

Figure 9A:
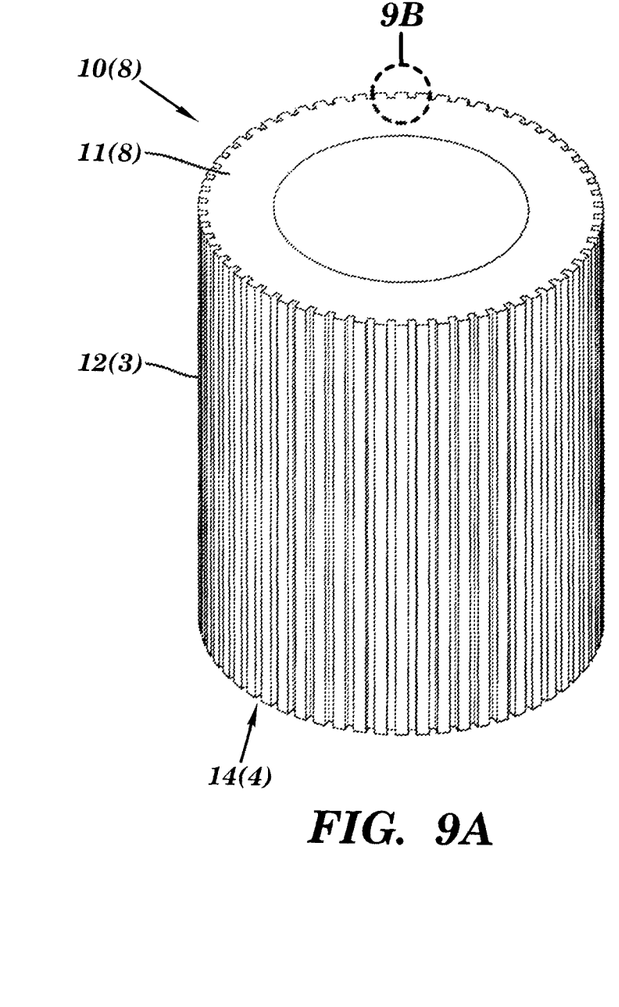
FIG. 9A is a perspective view of another exemplary tubular shaped device with an enhanced boiling surface with longitudinal cavities.
Figure 9B:
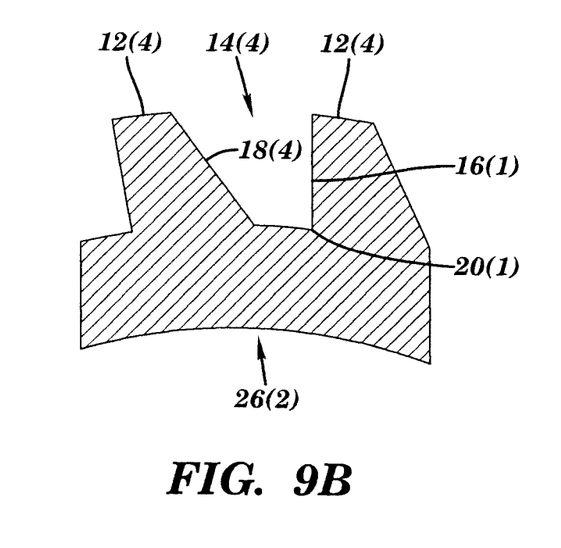
FIG. 9B is an enlarged view of an enhanced surface feature of the device shown in FIG. 9A.

Referring to FIGS. 9A-9B, another exemplary device 10(8) with an enhanced boiling surface is illustrated. The device 10(8) is the same in structure and operation as the device 10(1), except as illustrated and described herein. Elements in device 10(8) which are like those in devices 10(1)-10(8) will have like reference numerals.

In this particular example, the exemplary device 10(8) has a tubular shaped substrate 11(8) with an outer surface 12(4) which has a plurality of spaced apart and substantially parallel asymmetric shaped cavities 14(4) extending in a longitudinal direction along the tubular shaped substrate 11(7), although each of the asymmetric shaped cavities 14(4) could have other shapes, configurations and orientations and may only extend partially around the substrate. Each of the asymmetric shaped cavities 14(4) has a substantially straight sidewall 16(1) which extends in a direction substantially perpendicular from the outer surface 12(4) to the corner 20(1) which comprises a nucleation site, although each of the sidewalls could have other shapes, configurations, and other orientations.

Additionally, each of the asymmetric shaped cavities 14(4) has a bubble pathway surface 18(4) which has a first substantially flat portion which extends out from the corner 20(1) followed by another straight portion that extends back out to the outer surface 12(4), although each of the bubble pathway surfaces 18(4) could have other shapes, configurations, and other orientations. The first substantially flat portion helps to facilitate directing fluid and bubble away from the nucleation cavities 22(1) after bubble formation. The intersection of the two surfaces may be smoothed to facilitate the fluid flow and bubble passage away from the nucleating corner. The orientation of the taper for each of the bubble pathway surfaces 18(4) is shown to be in the same direction, although other configurations showing alternately changing taper directions can also be implemented. Any combination of these tapers can be implemented depending on the desired flow path for the vapor bubbles and the liquid flow. A heated region 26(2) is located inside the tubular shaped substrate 11(7) and on an opposing side from the outer surface 12(4), although the heated region could be in other locations.

Referring to FIGS. 1-2, an exemplary operation of the device 10(1) will now be illustrated and described. As illustrated by the arrows, the liquid may flow down the sidewall 16(1) from the end 28(1) of the land region 24(1) towards the corner 20(1) and/or may flow longitudinally along the sidewall 16(1) or the bubble pathway surface 18(1) without gravitational assistance in either or both directions. The nucleation cavity or cavities 22(1) at the corner generate nucleating bubbles B in the corner 20(1). Since the boiling surface closer to the heated region 26(1) is at a higher temperature than the sidewall 16(1), this causes a more rapid evaporation near the vapor-liquid interface closer to the heated region 26(1). This force causes the bubble B to grow and move away from the sidewall 16(1) and along the bubble pathway surface 18(1) which has less of a slope than the sidewall 16(1) and provides a pathway for the vapor and surrounding liquid to flow away from the corner 20(1) also without gravitational assistance. As each of the bubbles B and liquid shown by the arrows leave the asymmetric shaped cavities 14(1), liquid illustrated by the arrows is drawn back in along the sidewalls 16(1) to provide more cooling as described earlier. Accordingly, the exemplary device 10(1) as well as other examples of this technology (such as those illustrated and described herein by way of example) could have other orientations, such as upside down by way of example or any other intermediary orientation, or could be in a microgravity or zero gravity environment while still directing fluid and bubbles in the illustrated manner because of the configuration of the sidewalls and bubble pathway surface as illustrated and described by reference to the examples herein.

Referring to FIG. 3, an exemplary operation of the device 10(2) is the same as the exemplary operation of the device 10(1), except as illustrated and described herein. In this particular example, the indentation 32 in the bubble pathway surface 18(2) immediately adjacent to the corner 20(2) helps to facilitate directing the bubbles (not shown in this figure) and liquid shown by the arrows out along the bubble pathway surface 18(2). The bubble pathway surface 18(2) has a curved shape as it extends out towards the outer surface 12(1) which also helps to facilitate a smooth flow.

Referring to FIGS. 4A-4C, an exemplary operation of the devices 10(3a) and 10(3b) is the same as the exemplary operation of the device 10(1), except as illustrated and described herein. In this particular example, the land region 24(2) has the end 28(2) that tapers to a substantially zero width or point and helps to direct liquid flow down the sidewalls 16(2) towards the corners 20(1).

Referring to FIGS. 5A and 5B, an exemplary operation of the device 10(4) is the same as the operation of the device 10(1), except as illustrated and described herein. In this particular example, the fins 34(1) and 34(2) along with the shape, configuration and orientation of the asymmetric shaped cavities 14(3) allow for liquid flow to the nucleation sites 22(1) in corners 20(1) with vapor flow away from the nucleation sites 22(1) without interfering with the incoming liquid flow. The land region 24(3) is structured with a slope for the bubble pathway surface 18(3) such that the bubbles grow and depart away from the fin area, sweeping over the adjacent land region 24(3). The local heat transfer coefficient over the land regions 24(3) is very high due to passage of liquid and vapor flow caused by the growing and departing vapor bubbles. The height, shape and configuration of the fins 34(1) and 34(2) and land regions 14(3) for the device 10(4), their density and placement can be adjusted and optimized for the desired performance enhancement in the heat transfer coefficient and critical heat flux.

Referring to FIGS. 6A-6C, an exemplary operation of the device 10(5) is the same as the exemplary operation of the device 10(1), except as illustrated and described herein. In this particular example, the device 10(5) has twenty indentations 14(1) formed in the outer surface 12(1) of the substrate 11(5) which each help to transfer heat from a heated region on an opposing side (not shown) in the manner illustrated and described with reference to FIGS. 1-2.

Referring to FIGS. 7A-7B, an exemplary operation of the device 10(6) is the same as the exemplary operation of the device 10(5), except as illustrated and described herein. In this particular example, the device 10(5) has nine columns of indentations 14(1) formed in the outer surface 12(1) of the substrate 11(6) which each help to transfer heat from a heated region on an opposing side (not shown) in the manner illustrated and described with reference to FIGS. 1-2. As illustrated in FIG. 7B, with this example of the technology bubbles generated in the right hand side region of the cross-section are directed toward the right side by arranging the inclined sections to orient in the same direction. Nucleation sites are provided at or near the corner formed at the intersection of the sidewall 16(1) and the bubble pathways surface 18(1) essentially parallel to the liquid flow direction and the inclined surface directing the two-phase flow, either as a result of the manufacturing process or through specific operations. In the left hand side region of the cross-section illustrated in FIGS. 7B, the bubbles are directed toward left hand side. This creates a liquid feeding preferential pathway in the center of the device 10(6) towards the rounded region. This feature of providing a preferential pathway for liquid for a cluster of enhancement structures improves liquid irrigation over the boiling surface. This preferential liquid pathway can efficiently irrigate a larger heater surface with specifically designed clusters over the surface providing multiple preferential liquid supply paths to the center region of the cluster as illustrated in FIG. 7B. The bubble flow direction also could be designed to flow in other desired directions or angles to provide preferential bubble flow pathways, such as in a V-shaped arrangement away from the center to provide a wider pathway in the center for receiving incoming liquid for cooling by way of example only. Although only straight lines are shown for the preferential flow directions, curved surfaces can also be incorporated.

Referring to FIGS. 8A-8B, an exemplary operation of the device 10(7) is the same as the exemplary operation of the device 10(4), except as illustrated and described herein. In this particular example, the device 10(7) has a plurality of spaced apart and substantially parallel asymmetric shaped cavities 14(4) extending in a direction about a circumference of the tubular shaped substrate 11(7) which each help to transfer heat from a heated region 26(2) in the manner illustrated and described with reference to FIGS. 1-2. When the device 10(7) is operated in vertical direction, the tapered bubble pathways surfaces 18(4) are oriented such that the buoyancy complements the flow of bubbles and liquid over to the next tapered bubble pathways surface 18(4), although other orientations can be used.

Referring to FIGS. 9A-9B, an exemplary operation of the device 10(8) is the same as the exemplary operation of the device 10(4), except as illustrated and described herein. In this particular example, the device 10(8) has a plurality of spaced apart and substantially parallel asymmetric shaped cavities 14(4) extending in a longitudinal direction along the tubular shaped substrate 11(7) which each helps to transfer heat from a heated region 26(2) in the manner illustrated and described with reference to FIGS. 1-2. When the device 10(8) is operated in horizontal direction, the tapered bubble pathways surfaces 18(4) are oriented such that the buoyancy complements the flow in the vertical direction of bubbles and liquid over to the next tapered bubble pathways surface 18(4), although other orientations can be used.

Figure 10A:
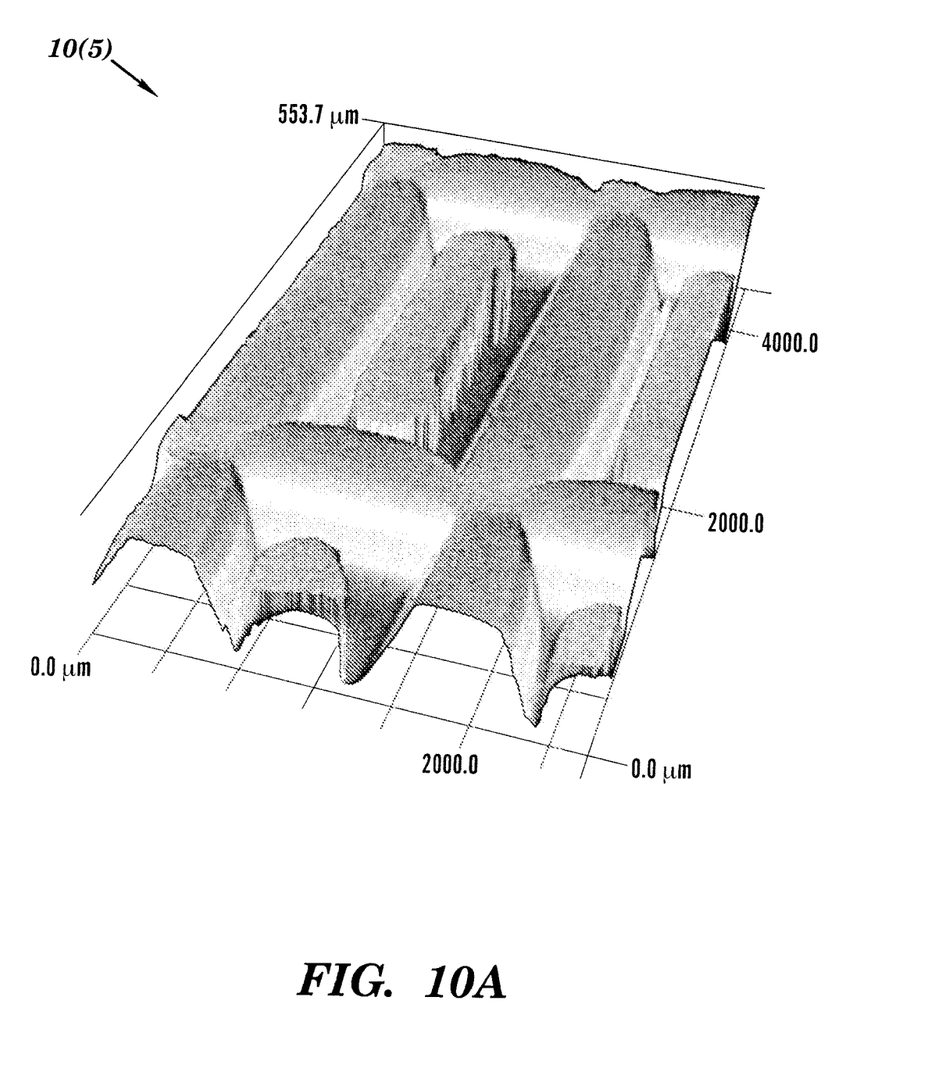
FIG. 10A is a laser scanning confocal microscope image of an exemplary device with an enhanced boiling surface having a plurality of discrete cavities.
Figure 10B:
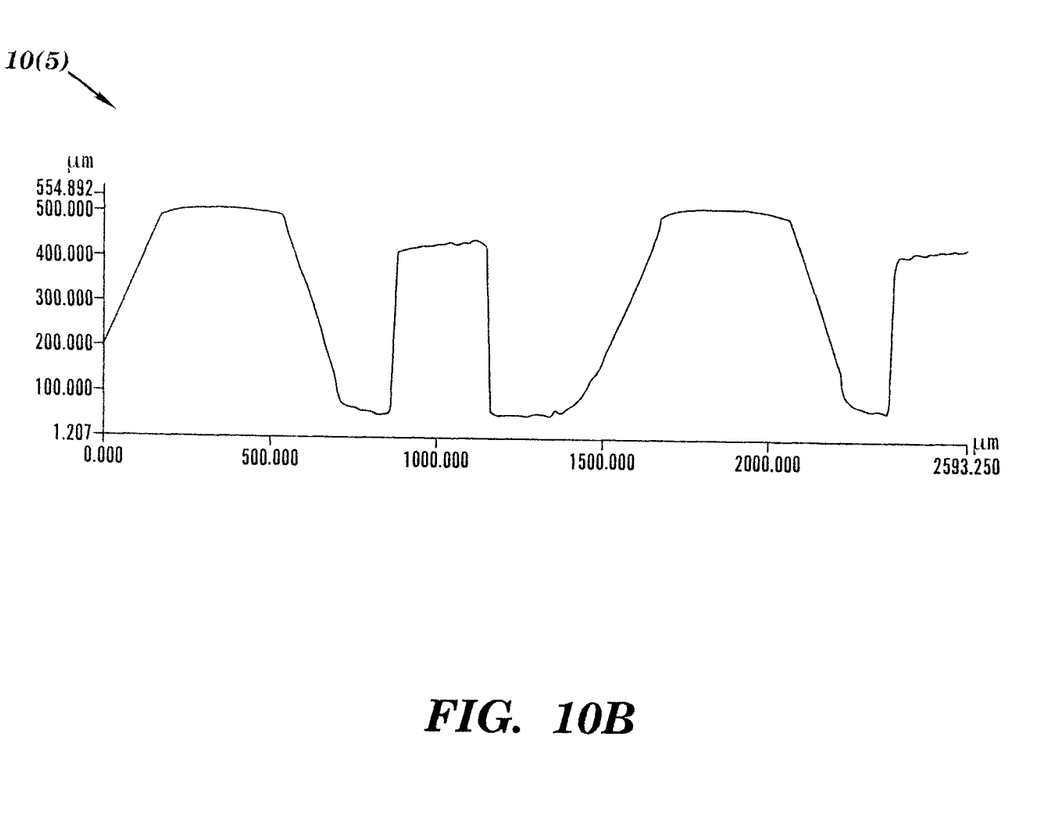
FIG. 10B is a cross-sectional side view of the device shown in FIG. 10A.

Referring to FIGS. 10A-10B, laser scanning confocal microscope images of an example of the device 10(5) illustrated and described in greater detail earlier with reference to FIGS. 6A-6C. More specifically, a three-dimensional view of the top surface of the device is shown in FIG. 10A and a cross-sectional view of the cavities formed by a punch normal to a long edge are shown in FIG. 10B. The dimensions of this exemplary version of device 10(5) are in micrometers.

Figure 11:
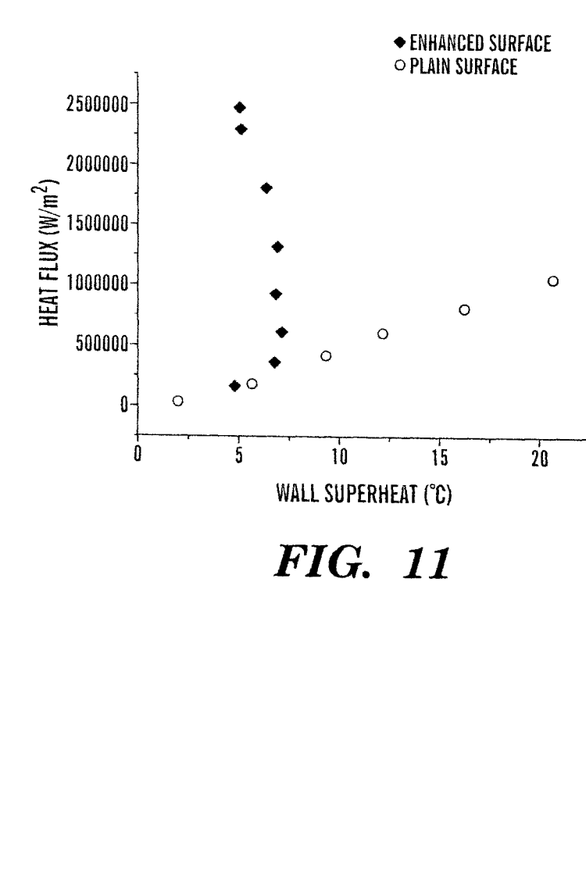
FIG. 11 is a graph of heat flux versus surface wall superheat plots for the device shown in FIGS. 10A and 10B with pool boiling of water at atmospheric pressure.
Figure 12:
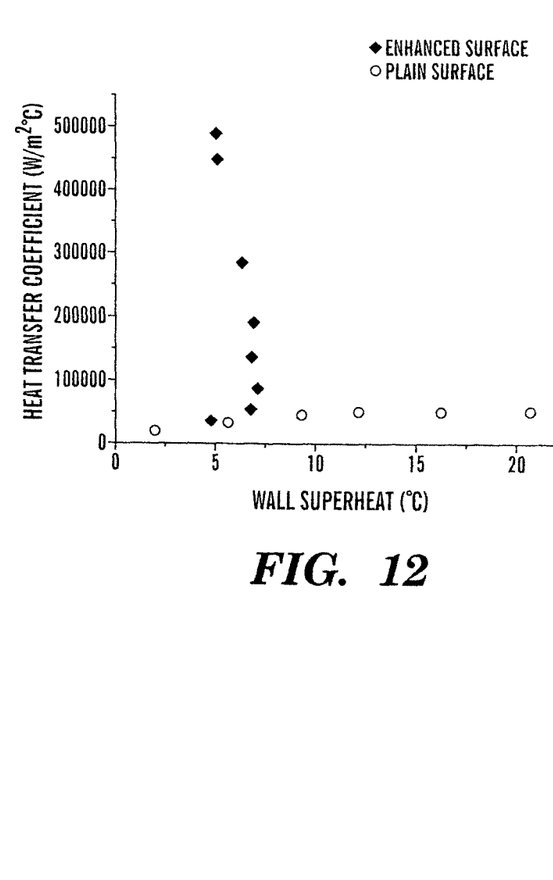
FIG. 12 is a graph of heat transfer coefficient versus surface wall superheat plots for the device shown in FIGS. 10A and 10B with pool boiling of water at atmospheric pressure.

Referring to FIG. 11, a graph of heat transfer performance of the exemplary device 10(5) under pool boiling is illustrated. As illustrated in this graph, a maximum heat flux of 2,500,000 W/m$^2$ was reached at a wall superheat of approximately 5° C. using the exemplary device 10(5) with water boiling at atmospheric pressure. Critical heat flux was still not reached. In this example, the experiments were stopped because of the power limitations in the experimental setup. The performance of an exemplary prior art device also is shown on the same plot which dissipates less than 40,000 W/m$^2$ at the same wall superheat of 5° C. Referring to FIG. 12, a graph of heat transfer coefficient versus surface wall superheat for the exemplary device 10(5) and for the exemplary prior art device with pool boiling of water at atmospheric pressure also is illustrated.

Accordingly, as illustrated and described by the examples herein, this exemplary technology enhances heat transfer during pool boiling for several reasons, including that with this technology bubbles nucleate at the bottom corner of the asymmetric shaped cavities and are propelled as they grow in a certain direction by the bubble pathway surface to move away to induce liquid flow back toward the nucleation site along the sidewall. The bubbles emerge from the asymmetric shaped cavities and continue to grow deriving the latent heat from the superheated liquid. The bubble growth causes liquid motion on the top surfaces (land region) and results in a very high heat transfer rate. The land width is relatively short and provides high heat transfer rate similar to the entrance region or heat transfer at the leading edge of a flat plate. Since the bottom of the asymmetric shaped cavities is at a higher temperature than the land region, nucleation occurs preferentially at the bottom of the asymmetric shaped cavities. The critical heat flux also is enhanced due to the directed liquid flow toward the nucleation site, and availability of some regions that are at a lower temperature to avoid nucleation on them while promoting heat transfer to liquid through the vapor-bubble interface motion as the bubbles emerge from the channels and grow along their trajectory. Accordingly, the placement of nucleation sites, incorporation of multiple level of heat transfer surfaces which are at differing temperatures, the various geometrical features illustrated and described with the examples herein to induce bubble growth, the trajectory and interface motion in specific directions provides by the asymmetric shaped cavities to provide a path and induce liquid motion toward the nucleation sites, and the removal of heat from the bottom surfaces of the asymmetric shaped cavities and land regions at different levels, all lead to enhancement of heat transfer coefficient and an increase in critical heat flux with this technology.

In other examples of this technology, the pool boiling also could be replaced by a flow of liquid or two-phase mixture over the asymmetric shaped cavities. With this technology, the bubbles and vapor generated would be carried away by the flow from the vicinity of the heated surface. The liquid or two-phase flow over the heated surface provides an efficient mechanism to remove the bubbles and thereby avoid the vapor build-up, which leads to critical heat flux condition. Gap height is a critical parameter. A very large gap will create a situation similar to pool boiling, and the benefits of flow will not be realized. Too small a gap will hinder the efficient removal of the bubbles and the vapor, leading to a lower critical heat flux. The flow is also expected to increase the heat transfer coefficient by imparting an additional force on the bubbles, and also creating thinner liquid film under the two-phase flow conditions over regions of the heater.

In another example of this technology, the liquid could be under subcooled conditions under both pool and flow boiling scenarios. The heat transfer mechanism with this technology is further enhanced by the condensation as the liquid-vapor interface of growing bubbles and vapor flow comes in contact with the subcooled liquid. This additional mechanism will be beneficial in enhancing the heat transfer as well as increasing the critical heat flux.

In another example of this technology, microchannel surfaces could be used in conjunction with a gap for flow. The microchannel orientation may be along the flow direction or in a direction at an angle to the flow, including perpendicular. The angled arrangement will further provide enhancement in critical heat flux by removing the bubbles from the vicinity of the downstream nucleating sites. The microchannel may be made of asymmetric surfaces as described and illustrated with reference to FIG. 7A and FIG. 7B.

In another example of this technology, microchannel surfaces could be used in conjunction with a gap for flow. The microchannel orientation may be along the flow direction or in a direction at an angle to the flow, including perpendicular. The angled arrangement will further provide enhancement in critical heat flux by removing the bubbles from the vicinity of the downstream nucleating sites. The gap for the flow may increase along the flow direction to help in stabilizing the flow boiling.

In another example of this technology, the profile of the surfaces in the asymmetric cavities could be structured in such a way that the bubbles flow in a certain direction over the heated region to provide enhanced microconvection effects. Nucleation in this region is not preferred to allow for smooth passage of vapor and bubbles. This passage of vapor and bubbles provides heat transfer enhancement through microconvection and transient conduction as liquid is pushed away. The passage of bubbles and liquid vapor interface also provides heat transfer enhancement though microlayer evaporation. This surface profile also provides for liquid to flow and cover the nucleation site being vacated by the departing bubbles. This feature provides transient heat conduction, and also is important in enhancing the critical heat flux as the vapor does not blanket the heater surface near the nucleation site and along its passage over the other regions of the heater surface.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A boiling apparatus comprising:
a substrate having a tubular shape comprising a base comprising an inside surface and an outside surface, a heat generation region contacting surface on the inside surface of the tubular shaped substrate and an asymmetric liquid contacting surface on the outside surface of the tubular shaped substrate, the asymmetric liquid contacting surface comprising a sidewall heat transfer surface extending out from the substrate base and a bubble pathway heat transfer surface extending away from the base of the sidewall, wherein the sidewall heat transfer surface and the bubble pathway heat transfer surface intersect to form a corner along the length of the intersection, the corner comprising a nucleation site comprising a plurality of nucleation cavities capable of forming bubbles in liquid in contact with the asymmetric liquid contacting surface, the sidewall heat transfer surface and the bubble pathway heat transfer surface forming a liquid boiling cavity in communication with a bulk liquid, wherein heat from the heat generation region applied to the inside surface of the substrate is transferred to the outside surface of the substrate and boils liquid from the bulk liquid in the liquid boiling cavity by the formation of bubbles at the nucleation site causing the bubbles to depart from the nucleation site traversing a bubble pathway along the bubble pathway heat transfer surface away from the sidewall heat transfer surface wherein the bubble pathway heat transfer surface is sloped away from the sidewall heat transfer surface to sweep the bubbles over the bubble pathway heat transfer surface enhancing heat transfer from the bubble pathway heat transfer surface and facilitating flow of the liquid from the bulk liquid in a direction perpendicular to the length of the intersection traversing a liquid pathway along the sidewall heat transfer surface towards the nucleation site enhancing heat transfer from the sidewall heat transfer surface, wherein the bubble pathway along the bubble pathway heat transfer surface and the liquid pathway along the sidewall heat transfer surface are separate non-interfering pathways intersecting at the corner creating a flow of the bubbles departing from the nucleation cavities wherein any bubbles formed along the bubble pathway heat transfer surface will be swept by the departing flow of the bubbles along the bubble pathway and the flow of bubbles does not interfere with the flow of liquid from the bulk liquid along the liquid pathway of the sidewall heat transfer surface toward the nucleation cavities, wherein the bubble pathway heat transfer surface originates at the single corner along the intersection of the sidewall heat transfer surface and the bubble pathway heat transfer surface, continuously extends away from the sidewall heat transfer surface and terminates prior to an adjacent asymmetric liquid contacting surface such that the overall heat transfer performance of the apparatus results in an enhancement in critical heat flux and heat transfer coefficient.

2. The apparatus as set forth in claim 1 further comprising at least one porous layer having one or more nucleation sites on at least one of sidewall and the bubble pathway surface.

3. The apparatus as set forth in claim 1 further comprising a depression in the bubble pathway surface adjacent the corner.

4. The apparatus as set forth in claim 1 further comprising one or more surface modification features on part or all of the sidewall or the bubble pathway surface, wherein the one or more surface modification features comprise at least one of uniform roughness, non-uniform roughness, any roughness, microfins, nanowires, nanostructures.

5. The apparatus as set forth in claim 1 wherein the liquid boiling cavity extends in a non-parallel direction with respect to an axis extending through the tubular shaped substrate and about at least a portion of a circumference of the tubular shaped substrate.

6. The apparatus as set forth in claim 1 wherein the liquid boiling cavity extends in a non-perpendicular direction with respect to an axis extending through the tubular shaped substrate.

7. The apparatus as set forth in claim 1 wherein the substrate has one or more fins extending out from the substrate.

8. The apparatus as set forth in claim 1 wherein at least a portion of the sidewall heat transfer surface is perpendicular with respect to the bubble pathway heat transfer surface.

9. The apparatus as set forth in claim 1 wherein a slope of the sidewall is steeper than a slope of the bubble pathway surface with respect to the liquid contacting surface of the substrate base.

10. The apparatus as set forth in claim 1 further comprising a land region between two or more liquid boiling cavities which are adjacent to each other.

11. The apparatus as set forth in claim 10 wherein an outer end of the land region tapers to a substantially zero width.

12. The apparatus as set forth in claim 10 wherein an outer end of the land region has a rounded shape.

13. The apparatus as set forth in claim 1 further comprising at least one channel in the substrate adjacent to the corner.

14. The apparatus as set forth in claim 13 wherein the at least one channel in the substrate is continuous.

15. The apparatus as set forth in claim 13 wherein the at least one channel in the substrate comprises a plurality of discontinuous sections.

16. The apparatus as set forth in claim 1 further comprising a plurality of liquid boiling cavities each having a bubble pathway surface oriented to extend in one direction.

17. The apparatus as set forth in claim 1 further comprising two sets of liquid boiling cavities, wherein each set of liquid boiling cavities comprises two liquid boiling cavities placed in a mirror image relationship having adjacent sidewall heat transfer surfaces and a bubble pathway heat transfer surface of one set is adjacent a bubble pathway heat transfer surface of the other set, wherein the bubble pathways along the bubble pathway heat transfer surfaces and the liquid pathways along the sidewall heat transfer surfaces are separate pathways intersecting at the corner creating a flow of bubbles departing from the nucleation cavities which does not interfere with the flow of liquid over the sidewall heat transfer surfaces toward the nucleation cavities.

18. The apparatus as set forth in claim 1 further comprising at least one fin disposed in an axial direction along the outside surface of the tubular shaped substrate.

* * * * *